United States Patent [19]

Toshiaki et al.

[11] 4,334,486
[45] Jun. 15, 1982

[54] ELECTRONIC SEWING MACHINE

[75] Inventors: Kume Toshiaki, Tachikawa; Hideaki Takenoya, Hachioji; Toshihide Kakinuma, Tokyo; Hachiro Makabe, Fussa; Kazuo Watanabe, Hachioji, all of Japan

[73] Assignee: Janome Sewing Machine Co., Ltd., Tokyo, Japan

[21] Appl. No.: 133,126

[22] Filed: Mar. 24, 1980

[30] Foreign Application Priority Data

Mar. 26, 1979 [JP] Japan ............................ 54-35212

[51] Int. Cl.³ .............................................. D05B 3/02
[52] U.S. Cl. ................................................. 112/158 E
[58] Field of Search .......... 112/158 E, 121.11, 158 R, 112/121.12

[56] References Cited

U.S. PATENT DOCUMENTS

4,200,048  4/1980  Makabe et al. .............. 112/158 E
4,236,469  12/1980  Takenoya et al. ............ 112/158 E Primary Examiner—Peter P. Nerbun
Attorney, Agent, or Firm—Michael J. Striker

[57] ABSTRACT

An electronic sewing machine with an electronic memory and electronic circuit for controlling the needle amplitute and the fabric feed in order to form a plurality of stitching patterns includes a plurality of pattern-selecting buttons on the pattern panel of the machine, an inverse memorizing button for inversing a pattern selected by the pattern selecting buttons, a memorizing button which causes the electronic memory to store a plurality of patterns in cooperation with the pattern selecting buttons, a function selector for dropping feed dog means with respect to the needle plate in cooperation with the pattern selecting buttons, and a twin-needle button for reducing the needle lateral amplitude.

8 Claims, 9 Drawing Figures

- ㊳ Stored pattern is being stitched
- ㊴ Memory is full
- ㊵ Memorized data is registered
- ㊶ Pattern inverting switch is turned ON
- ㊷ Changing to pattern inverting
- ㊸ 1 is added to address of RAM
- ㊹ Feed control phase
- ㊺ Feed dog switch is turned ON
- ㊻ Feed dog is switched
- ㊼ Registering function as to switch
- ㊽ Registering function as to switch for VR$_W$, VR$_F$, twin-needle and feed dog dropping
- ㊾ Erasing function as to switch
- ㊿ Needle swing control phase
- �localhost Memorized pattern
- ㊼ One cycle is finished
- ㊽ Next memory pattern
- ㊾ Reading out of pattern data in ROM
- ㊿ Determination of new coordinate
- 56 Determination of steps of PM$_W$, PM$_F$
- 57 Step is 0
- 58 One step movement of PM$_W$, PM$_F$
- 59 Step is 0
- 60 Energization time is set and timer interrupts

FIG. 6

ELECTRONIC SEWING MACHINE

BACKGROUND OF THE INVENTION

The invention relates to a sewing machine employing an electronic memory for controlling needle lateral amplitude and fabric feed so as to form a plurality of stitching patterns, and more particularly to an electronic sewing machine provided with a pattern selecting controller which selects desired patterns in said plurality of stitching patterns, a memory controller which stores a combination of plural patterns, a function selector which selects function to be required in accordance with formation of selected patterns, including operation for selecting twin-needle stitching, a function cancelling means for removing selection of the function, and a calculation processing device which, when said function cancelling means is operated, controls respective functions by way of program control signals stored in said electronic memory, and carries out control to maintain designation of patterns selected by said pattern selecting controller, or designations of patterns during stitching patterns.

In the prior art, when selecting the desired patterns, the function must be selected each time in accordance with the patterns to be selected, irrespectively of those of frequent use or not used so much; and therefore the sewing operation is very complicated and inefficient.

SUMMARY OF THE INVENTION

The present invention has been devised to eliminate such defects and disadvantages of the prior art. It is a primary object of the invention to provide high efficiency of the sewing operation.

It is another object of the invention to provide a sewing machine easy in operation.

The other features and advantages of the invention will be apparent from the following description of the invention in reference to the preferred embodiment as shown in the attaching drawings.

BRIEF DESCRIPTION OF THE DRAWINGS

FIG. 2-A and FIG. 2B show perspective views of a mechanism of the sewing machine;

DETAILED DESCRIPTION OF THE INVENTION

Figure 1:
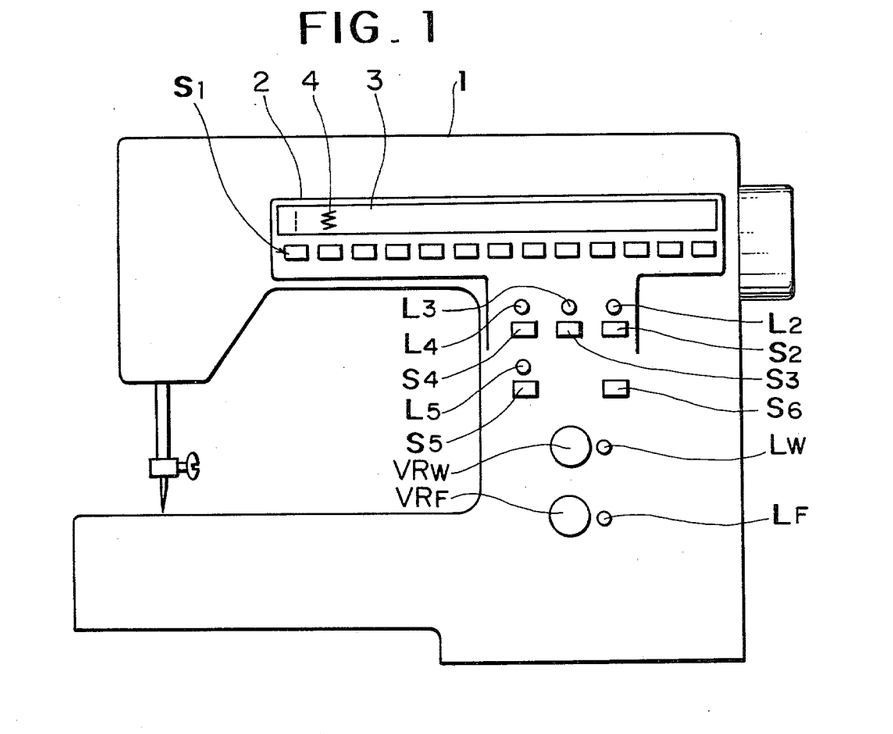
FIG. 1 is a schematic view of a front part of a sewing machine, showing an embodiment of the invention.

The present invention will be explained in reference to the attaching drawings. In the drawings, the numeral 1 is a machine housing, 2 is a front panel, and 3 is an opaque panel on which pattern indicators 4 are printed (in FIG. 1 the pattern indicator is partially shown and others are omitted). Indicating lamps are arranged in correspondence to the respective patterns, which illuminate a selected pattern indicator from a rear side of the pattern panel 3, and when any one of pattern selecting buttons or switches S1 is operated, the indicator of the selected pattern is illuminated. S2 is an operating button or switch for inverse memory which stores an asymmetrical pattern in inverse at the center of the needle lateral amplitude with respect to the right and left (the lateral amplitude direction of the needle) of the pattern to be selected by the pattern selecting button S1, and repetition of the combining operation of the switches S1 and S2 enables to store a plurality of the patterns. S3 is a storing operation button for storing a plurality of the patterns and a sequence of forming the patterns in cooperation with the pattern selecting button S1, and for storing successive memory in couple of the switches S1, S3 and the switches S1, S2. S4 is a button or switch for operating the feed dog dropping mechanism, which is used in the stitching where the fabric feed by the feed dog is unstable as in the button stitching or the basting, and this operation lowers the feed dog under the needle plate during the stitching operation, and at this time makes operative the needle lateral amplitude by the operation button S1. The re-operation of buttons S1 effectively returns lowering of the feed dog. S5 is an operating button of the twin-needle and the operation thereof reduces the amount of the needle lateral amplitude in the fixed ratio, such that the needle does not get out the maximum lateral amplitude of the normal single needle. The re-operation of button S5 returns to that of the single needle. S6 is a memory cancelling operation button for cancelling an order by operation of the inverse memory and memory operation buttons S2, S3. VRw is a dial for adjusting the stitching width, which is made operative by pushing it. When rotating the dial VRw, the width of the needle lateral amplitude is enlarged or reduced proportionally. $VR_F$ is a stitching length adjusting dial which enables adjusting the amount of the fabric feed. The re-pushing operation of the dials VRw, $VR_F$ makes the adjusting value inoperative and returns the sewing machine to the automatic setting value. L2-L5, Lw and $L_F$ are lamps indicating that the above mentioned operations are operative.

Figure 2A:
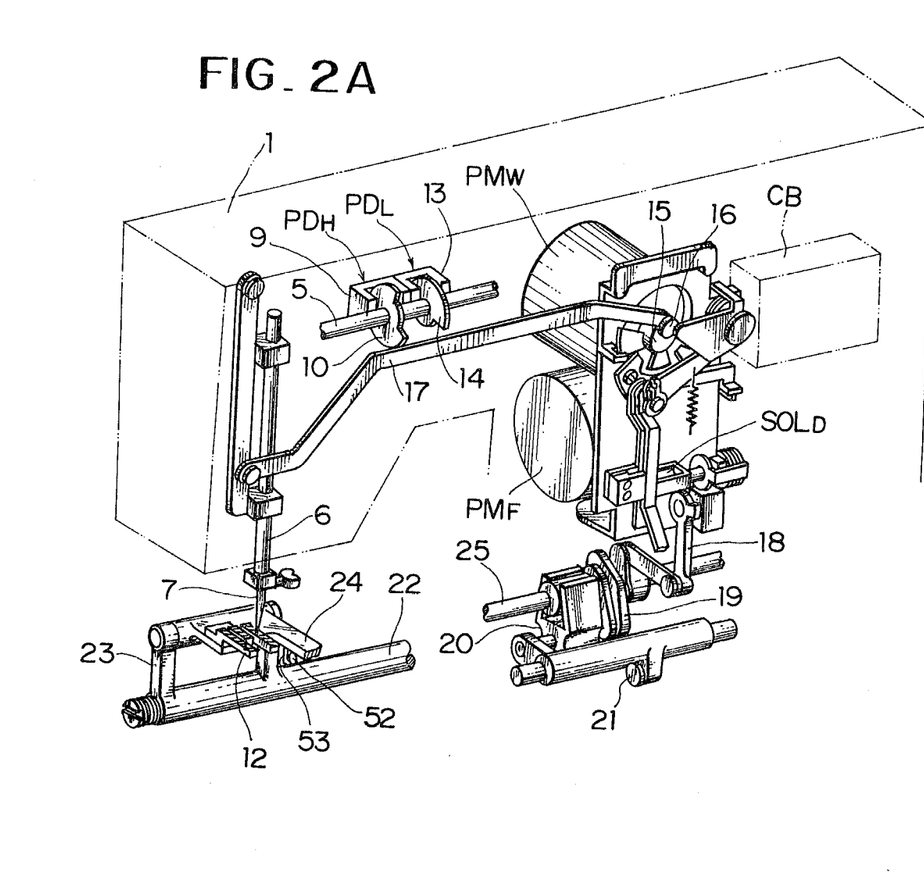
Figure 2B:
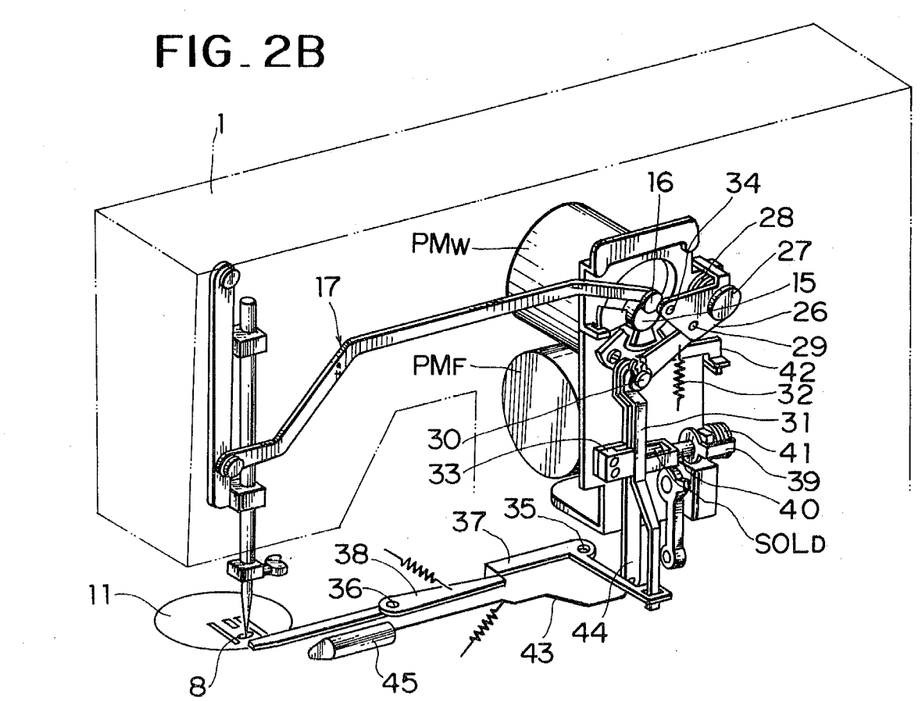

FIG. 2-A and FIG. 2-B are perspective views of the machine mechanism, and FIG. 2-B especially shows the parts omitted in FIG. 2-A. In the drawings, the numeral 5 is an upper shaft of the sewing machine which is driven by a machine motor (not shown) to vertically move a needle 7 via a needle bar 6. $PD_H$ is a synchroneous pulse generator for detecting the upper position of the needle to thus detect the phase for controlling the needle lateral amplitude and a needle dropping hole changing device. The pulse generator is composed of a photoemitting device 9 secured to the machine body 1 and a photo interruptor 10 secured to the upper shaft 5, which pulse generator issues, per rotation of the upper shaft 5, a H level signal at a predetermined angular position of the upper shaft 5 when the needle 7 is above a needle plate 11 (FIG. 2B). $PD_L$ is a synchroneous pulse generator for detecting the lower position of the needle to thus detect the phase for controlling the fabric feeding movement and a feed dog dropping mechanism. This generator is composed of a photoemitting device 13 and a photo interruptor 14, and issues a H level signal at a predetermined angular position of the upper shaft 5 when the needle 7 is under the needle plate 11. CB is a control device. FMw is a pulse motor for controlling the movement of the needle bar 6 laterally of the fabric feeding direction through a transmission rod 17 which is at one end connected to a swingable needle support (not shown) as well known, and is at the other end operatively connected to a rotational shaft at a point 16 of the motor through a link 15. $PM_F$ is a pulse motor for controlling the fabric feeding movement, namely the horizontal movement of the feed dog 12 in the forward and rearward directions via a link 18, which is connected by a belt to the rotational shaft of this pulse motor, a feed regulator 19, a fork rod 20, a connected link 21, a transmission shaft 22, vertical arms 23, and a feed dog bed 24. The numeral 25 is a lower shaft which is rotated in synchronism with the upper shaft 5 to rotate a thread loop taker (not shown). The pulse motor $PM_F$ is provided with a photo interruptor segment (not shown) as with the pulse motor PMw (shown in FIG. 4), and detects the control position of the feed adjuster 19 in cooperation with a photoemitting device $PD_F$ which will be explained below. The pulse motor PMw also serves to change a needle dropping hole 8 of the needle plate 11 (FIG. 2B) to a lateral oblong hole for stitching patterns and to a circle hole for stitching straight stitches. With reference to FIG. 2B, the numeral 26 is a needle dropping hole changing arm pivoted around a changing shaft 27 which is movable in a direction parallel with the shaft of the pulse motor PMw. The arm 26 is normally biased in the direction toward the machine operator by a spring 28. Although not shown, the shaft 27 is connected with a plunger of a needle dropping hole changing clutch selenoid $SOL_N$ (shown in FIG. 4). This solenoid is energized to move the arm 26 toward the pulse motor PMw against the spring 28. The arm 26 is provided with an engaging pin 29 which is connected to one end of a lever 31 which is at the intermediate part thereof pivoted at a pivot. The lever 31 is biased in the clockwise direction by a tension spring 32 until the lever 31 is stopped by a stopper 33. On the other hand, the spring 32 biases the arm 26 in the counterclockwise direction. The changing arm 26 is also provided with a pin 34. Under a condition that the lever 31 contacts the stopper 33 when the link 15 causes the transmission rod 17 to move the needle bar 6 to the right position (the maximum control position of the pulse motor PMw in the clockwise direction), the solenoid $SOL_N$ is energized to displace the arm 26 to a position toward the pulse motor PMw, in which the pin 34 is engaged by the link 15 to transmit the rotational movement of the pulse motor PMw to the arm 26, thereby to change the needle dropping hole 8 to the straight stitching circle hole. Then the solenoid $SOL_N$ is made non-energized. In a condition other than the above mentioned, even if the solenoid $SOL_N$ is made non-energized, the changing arm 26 cannot be moved to the front side in FIG. 2-A or FIG. 2-B and maintains the engagement with the pulse motor PMw. The movement of the changing lever 31 is transmitted to the needle bar 6 by an intermediate lever 37 pivoted at 35 and the changing lever 38 pivoted at 36. When the changing lever is moved to the counterclockwise direction as shown in FIG. 2-B, the needle dropping hole 8 is oblong for the zigzag stitching, and the lever 38 is turned in the clockwise direction from the shown condition so that an auxiliary needle plate (not shown) at the lever end partially covers the needle hole 8 to provide the straight stitching circle hole. This turning movement of the lever 38 is effected due to the rotation of the pulse motor PMw. The pulse motor $PM_F$ serves to make the feed dog 12 inoperative by selection of the basting stitches. The numeral 39 is a feed dog changing arm which is rotatably pivoted around the shaft 40 and is movable together with the shaft 40 in a direction parallel with the shaft of the pulse motor $PM_F$ and which is pivoted with a spring 41. The shaft 40 is connected to a plunger (not shown) of the feed dog changing clutch solenoid $SOL_D$ (shown in FIG. 4) and is displaced together with the arm 39 in the leftward direction against the spring 41 when the solenoid $SOL_D$ is energized. The numeral 42 is a feed dog changing lever pivoted at 30, and although not shown, the changing arm 39 is releasably engaged with the pulse motor $PM_F$ as the changing arm 26 transmits the rotation of the pulse motor $PM_F$ to the lever 42. That is, the lever 42 contacts the stopper 33, and in such a condition and when the solenoid $SOL_D$ is energized and then the pulse motor $PM_F$ rotates to the maximum clockwise controlling position, the rotation of the pulse motor $PM_F$ is transmitted to the arm 39. By the rotation of the pulse motor $PM_F$, the feed dog 12 is dropped below the needle plate 11, and after then the solenoid $SOL_D$ is made non-energized. In a condition other than the above mentioned, even if the solenoid $SOL_D$ is made non-energized, the arm 39 is kept in engagement with the pulse motor $PM_F$. The numeral 43 is a plunger rod which is at one end connected to the lower end 44 of the lever 42 and the plunger rod 43 is at the other end connected to a plunger 45.

Figure 3:
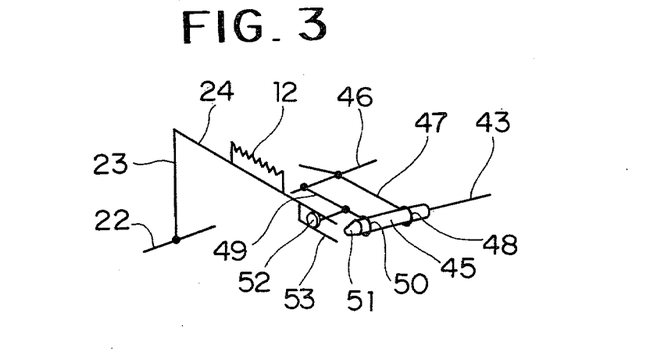
FIG. 3 is a schematic view showing a mechanical part of the mechanism.

FIG. 3 diagrammatically shows the operation of the plunger 45. The plunger 45 is inserted in a hole 48 at the free end of a link 47 secured to a vertical feed control shaft 46 which is rocked in synchronism with rotation of the lower shaft 25 shown in FIG. 2-A. The plunger 45 is formed with a tapered free end 51. As the lever 42 in FIG. 2-B is turned in the clockwise direction the plunger 45 is inserted into a hole 50 formed at the end of a link 49 which is pivoted on the vertical feed control shaft 46. On the other hand, as the lever 42 is turned in the counterclockwise direction, the plunger 45 is pulled out of the hole 50. The link 49 has a laterally projected pin 52 which is in engagement with a fork 53 of a base 24 supporting the feed dog 12. One end of the base 24 is pivotally connected to the upper end of a link 23 which is swingable by a rocking shaft 22 for horizontally reciprocating the base in synchronism with rotation of the sewing machine. It is, therefore, apparent that the feed dog 12 is operative if the plunger 45 is in the hole 50 of the link 51, and the feed dog 12 is dropped into the position below the level of the needle plate 11 if the plunger 45 is pulled out of the hole 50.

Figure 4:
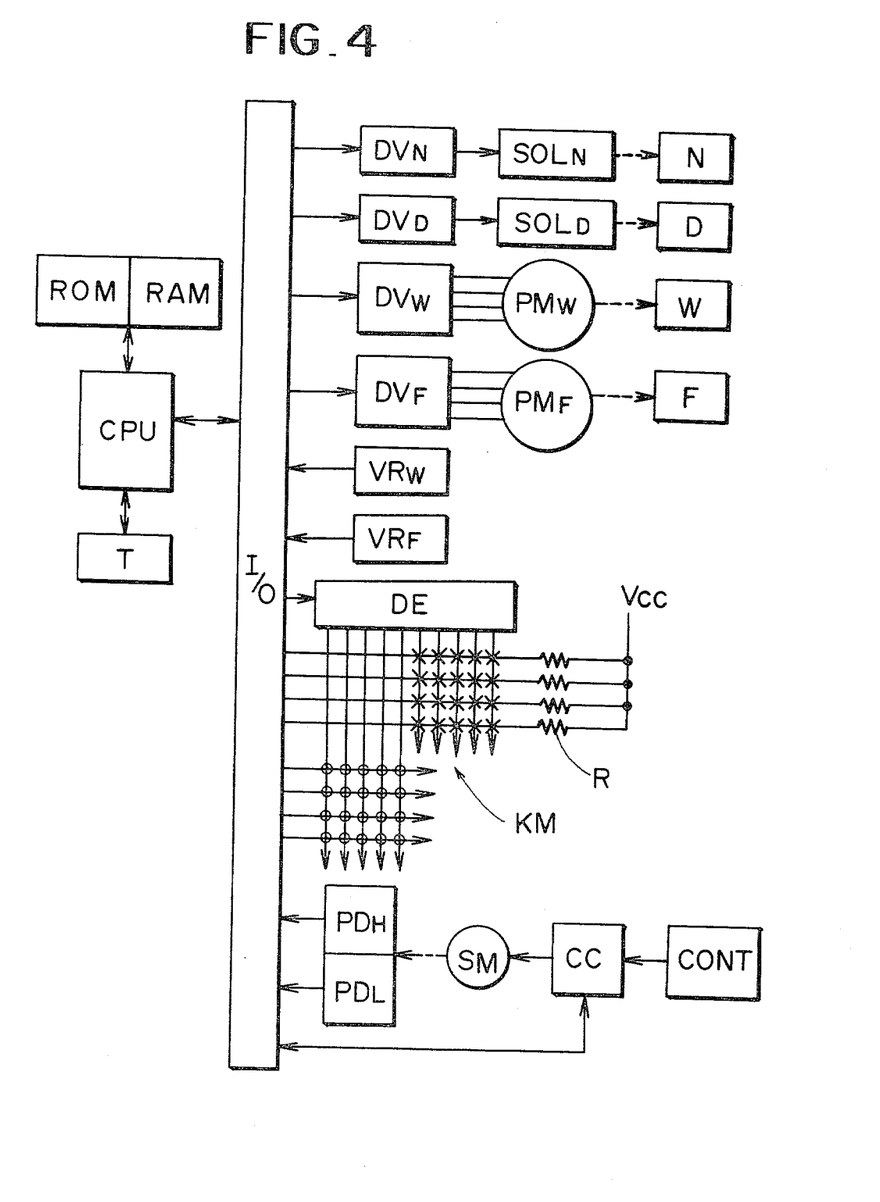
FIG. 4 is a block diagram of the control of the sewing machine.

FIG. 4 shows a block diagram of a control circuit, and the main parts thereof are housed in the control part CB. Connections shown with solid lines designate electrical connections of respective elements, and the arrow marks show directions of control. Mechanical connections are shown with dotted lines. ROM is a read-only-memory storing stitch control signals for forming stitch patterns to be selected by the pattern buttons S1 and program control signals for performing programs. CPU is a central processing unit for carrying out program controls. RAM is a random-access-memory which temporarily stores process or result of the programs. T is a timer. I/O is an input-output port, and KM is a key matrix which scanningly reads out the control signals of operating buttons S1–S6 under the control of CPU. DVw and $DV_F$ are pulse motor drive devices for controlling the swinging movement of the needle and for the fabric feeding movement. The drive devices are provided with the pulse motor driving power sources, which, in response to the orders from CPU, successively performs energizing or non-energizing control of a single or plural couples to the phases constituting the needle lateral amplitude controlling pulse motor PMw and the fabric feed controlling pulse motor $PM_F$ in order to drive those motors normally or reversely. The pulse motor PMw operates the needle swinging mechanism W including the transmission rod 17 shown in FIG. 2A, and the pulse motor $PM_F$ operates the fabric feed control mechanism F including the fabric feed regulator 19 FIG. 2A. The clutch solenoid $SOL_N$ for changing the needle dropping hole is driven by the driving devices $DV_N$ including a solenoid driving power source, and the pulse motor PMw is driven, prior to stitching, to operate the needle dropping hole changing mechanism N including the switching lever 37. The clutch solenoid $SOL_D$ for changing the feed dog is driven by the driving device $DV_D$ prior to stitching, and the pulse motor $PM_F$ is driven to operate the feed dog changing device including the plunger 45. The control amount of the dials VRw, $VR_F$ are read out by control of CPU. CC is a machine motor control part connected to a motor driving power source, and drives the machine motor SM by operation of the controller CONT. This control is that the control part CC detects the operation of the controller CONT and CPU receives the detecting signal and causes the controller CC to receive the speed control signal produced by operation of the controller CONT. The detector $PD_L$ gives CPU a signal indicating that the needle is at the lower position to determine the drive timing of the pulse motor $PM_F$.

Figure 5A:
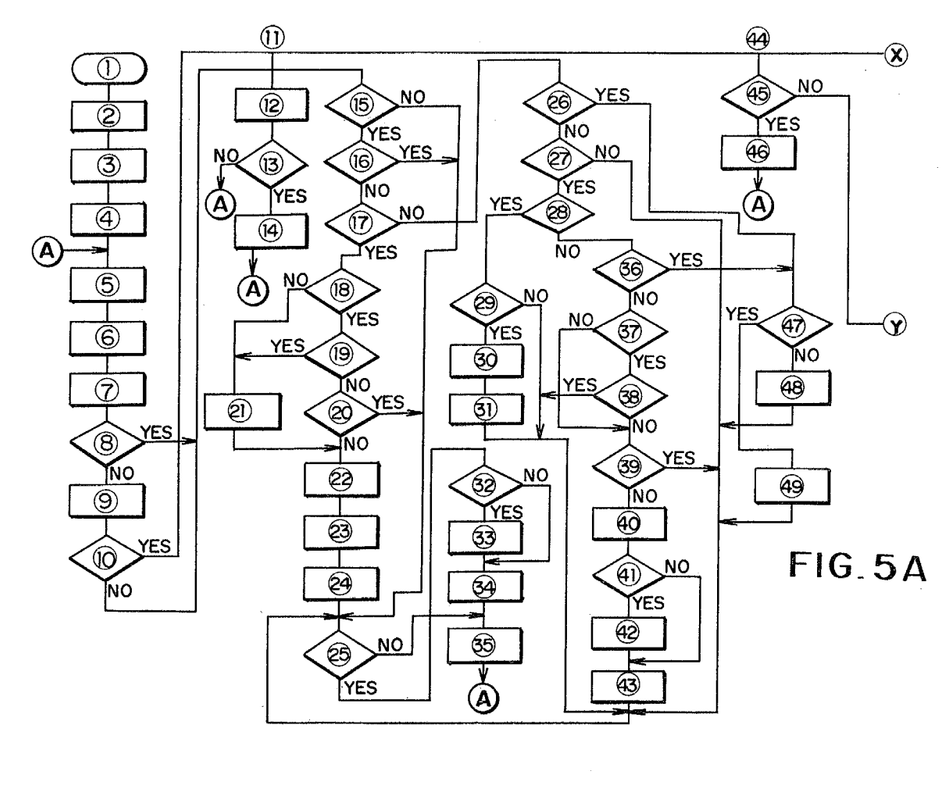
FIG. 5 and FIG. 6 are flow charts showing the operation of the invention.
Figure 5B:
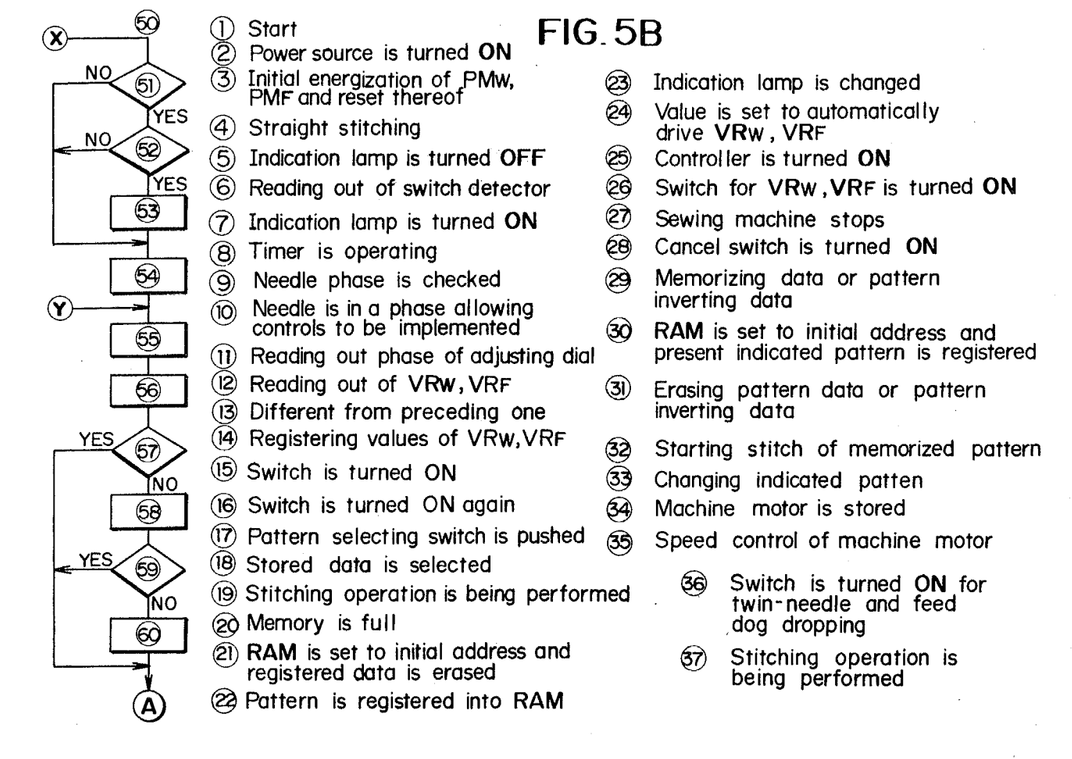
Figure 5C:
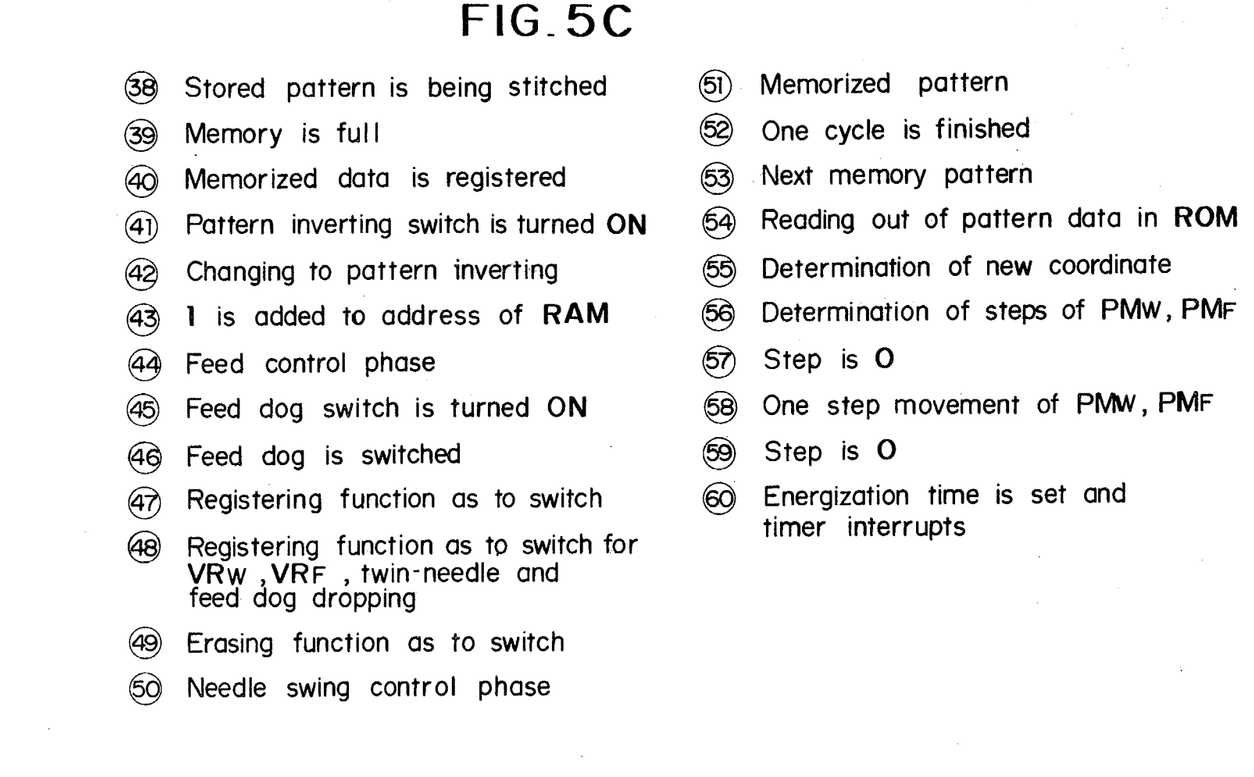

The present invention is constructed as mentioned above and a reference will be made to an operation thereof. FIG. 5 is a flow chart showing the operation of the control circuit shown in FIG. 4. When the AC power source is applied, each of the control power source in FIG. 4 is made ON and starts the program to be controlled around CPU, and each of the elements in FIG. 4 including the pulse motors PMw, $PM_F$ is reset. Although the pulse motors PMw, $PM_F$ are not shown in detail in the flow chart, they are effected with initial energization and reset at initial rotation positions to make phases of startings in controlling the pulse motors. Those motors make respective functions for the straight stitch in order to designate the normal stitching when the operation of the pattern selecting switch S1 is absent. That is the needle 7 is moved to the lateral amplitude and the needle dropping hole 8 is prepared for the straight stitch of the circle hole. Subsequently the indicating lamps corresponding to the switch S1 and the indicating lamps L2-L5, Lw and $L_F$ are all made OFF. This condition is made in that there is not a cooperation that the control lines in x-direction (output of a decoder DE) and y-direction (output of input-output port I/O) are simultaneously made operative in crossing points (shown with circles) of the control lines having lamps to be scanned in the key matrix KM in FIG. 4. CPU reads out the pushing operations of the dials VRw, $VR_F$ and the switches S1-S5 and the detecting values of the detectors $PD_H$, $PD_L$. The reading-out of each of the switches is carried out by detecting short-circuitings of one couple or the plural couples in the control lines of x-direction (the output of the decoder DE) and y-direction (the output of the input-output port I/O), by operating the switches to be scanned in the key matrix KM in FIG. 4 in the crossing points (shown with crossing marks) of the control lines. The indicating lamps corresponding to the respective switches are made ON. Since the timer T is inoperative, a needle phase is checked to discriminate changing points of the signals of the detector $PD_H$ of the upper position of the needle and the detector $PD_L$ of the lower position of the needle, and it is discriminated whether these phases are later mentioned control operative phases. In this discrimination, when there are neither L level which is a detection to be designated in this embodiment nor a rising signal from L level to H level, the detectors $PD_H$, $PD_L$ discriminate whether the switches S1-S6 and the control dials VRw, $VR_F$ are present in the pushing operation. When these dials are operated and if they are not pushed simultaneously, it is discriminated whether this operation is by the pattern selecting switch S1. It is the pattern selection, after an inversion memorizing switch S2 or a memorizing switch S3 and prior to an operation of the controller CONT for shifting to the stitching. When there is a space for the designation of the RAM storing an initial address in a plurality of the pattern stitching control signals, the RAM stores this initial signals. The inversion memorizing switch S2 or the memorizing switch S3 increases an address one by one per each operation to the memorizing spaces of 0-7 corresponding to the addresses composed of 0-7 of the RAM as shown, and designates the memorizing position in order of 1-7 and memorizes the address including signals designating inversion feed or normal feed. The address 0 in the table is used only to the operation of the pattern selecting switch S1. That is, an initial address of an initially designated pattern is registered in 0 address by the operation of the initial pattern selecting switch S1, and an address 1 is designated by the operation of the inverse memorizing switch S2 or the memorizing switch S3, and subsequently when the pattern selecting switch S1 is operated, an initial address of this pattern is registered in an address 1. When the registration reaches up to the address 7, a subsequent address is not registered. This memorization is finished by operating the controller CONT, and a subsequent pattern selection designates the address in the table at 0 and cancels other initial addresses. The initial address stored in RAM increases from 0 to 7 and repeatedly reads out to realize a plurality of the patterns. The repeating operation of the pattern selecting switch S1 substitutes the initial address in an initial address of RAM and registers it without operating the inverse memorizing switch S2 or the memorizing switch S3, and a pattern is indicated which corresponds to an initial address most newly registered in RAM. The dials VRw, $VR_F$ of the needle amplitude and the fabric feed are made inoperative and are set at the stitch controlling value designated as an automatically predetermined pattern, and it is discriminated whether the controller CONT is shifted from OFF to ON. The switches are not operated in the discrimination of ON of said switches, and when the switches are pushed simultaneously, it is discriminated whether the controller CONT is shifted from OFF to ON without finishing the above mentioned processes. When the controller CONT is shifted from OFF to ON, it is discriminated whether it is a start of the pattern initially stored in the memorization of a plurality of the patterns, and if it is a start, such a pattern is indicated to start the machine motor SM, and the machine motor SM is speed-controlled by said controller CONT and the program returns to a returning point (1). In the other patterns, this indication is not changed and the machine motor is started.

TABLE

| Addresses | Initial address No. of patterns |
|---|---|
| 0 | 0 |
| 1 | 1 |
| 2 | 2 |

TABLE-continued

| Addresses | Initial address No. of patterns |
| --- | --- |
| 3 | 3 |
| 4 | 4 |
| 5 | 5 |
| 6 | 6 |
| 7 | 7 |

Figure 6:
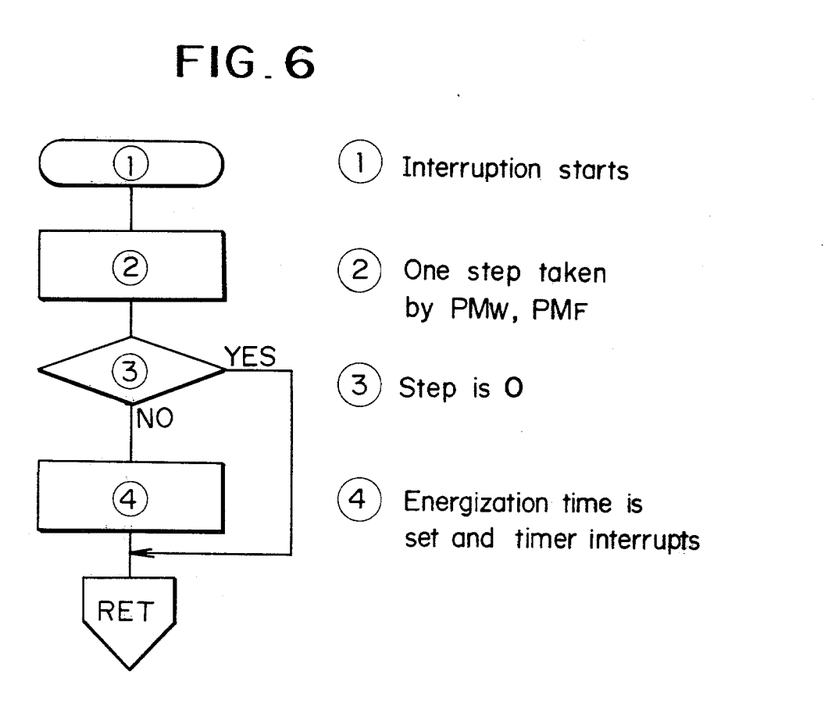

When said switch ON does not depend on the pattern selecting switch S1, the switches of the dials VRw, VR$_F$, the starting by the controller CONT, the cancelling switch S6, the twin-needle designating switch S5 or the feed dog dropping switch S4, the switch ON depends on the inverse memorizing switch S2 or the memorizing switch S3. If the pattern is selected not after once operation of the controller CONT and if the storing space is not full, the pattern which is selected by the selecting switch S1 prior to the operation of the switches S2, S3, is registered in the address in accordance with the operation before the present operation of the switches. After entering the sewing operation and if this sewing operation is a memorizing stitch the registration is not accepted, but if it is not a memorizing stitch, the registration is accepted to store the stitch including this stitch. In this case, although not shown in the flow chart, the operation of the switches S2, S3 cancels duration of the operation so as to store subsequent other stitches including said stitches for shifting to a routine of NO in the discrimination. When depending on the inverse memorizing switch S3, the content of RAM is made an inversion order. The program advances the address in each of the memorizations and enters the process of OFF→ON of the controller CONT. During driving the sewing machine, these function switches are not accepted. When the cancelling switch S6 is operated, the memorizing or inversion memorizing pattern is, during the stitching operation, registered at the address 0 of the initial address of the table of the pattern now in operation and the registration of other memorizing patterns is cancelled. The operation of said cancelling switch cancels only the operation of the switches and does not cancel others. The operations of the switches by the adjusting dials VRw, VR$_F$, the twin-needle switch S5 and the feed dog dropping switch S4 register respective functions to these switches if the functions are not registered, and if they are registered they are cancelled. When the detectors PD$_H$, PD$_L$ are at L level, the level is reading phases of the adjusting dials VRw, VR$_F$, and the program registers the adjusting data based on the operation of the dials and returns to the returning point (1). The registered data is operative with the registration of the functions of the switches of the dials VRw, VR$_F$, and when not accompanying the function registration, the data is based on the controlled value designated independently. When the sewing machine is operated the detector PD$_H$ of the upper position of the needle issues a signal changing L level to H level, it is an amplitude phase. Although omitting the program, the needle dropping hole 8 is changed, in response to the kind of the selected pattern, from the circle hole for the straight stitching to the lateral oblong hole for the pattern stitching, and if it is required to change the lateral oblong hole to the circle hole, a needle dropping hole program is performed. This performance is carried out by operating the solenoid SOL$_N$, driving the pulse motor PMw, changing the needle dropping hole 8, and making the solenoid inoperative. When the switches S2, S3 are not operated in the lateral control phase, the stitch control data of ROM is read out for the normal straight stitching. The address designation of ROM in this process at changing to H level per rotation of the sewing machine advances. If the memorizing switches S2, S3 are operated, the reading-out of the ROM advances until the pattern (one cycle) corresponding to one address in the table finishes, and when one cycle finishes the cycle is shifted to a next pattern. When the the detector PD$_L$ issues a signal changing L level to H level, it is a feed control phase, and the changing of the feed dog is discriminated in accordance with the feed dog dropping switch S4, and if necessary the feed dog is dropped or the feed dog is changed to effectively return the feed dog. Although this program is not described in detail, it operates the solenoid SOL$_D$ and drives the pulse motor PM$_F$ to drop the feed dog 12 and subsequently makes the solenoid SOL$_D$ inoperative. In this feed phase, the reading-out data of the ROM is performed for the feed control. The reading-out data of ROM is multiplied with constants designated by the dials VRw, VR$_F$ and the twin-needle switch S5, otherwise automatically set so as to determine a new coordinate which is going to form stitches. In order to position the stitch control mechanisms W, F on this new coordinate, a calculation is carried out on a difference from the coordinate where the stitch control mechanisms are now positioned, and the pulse motor is caused to determine the driving step number of the motor to be moved. It is discriminated whether the step number necessary to the movement is 0 in order to make this movement only when being different from the present position. If this is not 0, an order is given to move these pulse motors PMw, PM$_F$ by one step to a direction which is determined by positive or negative in said difference and a moving signal is given. If the calculation of said difference (the step number of driving the motor) based on the result of said order is not 0, a time until a next energization is set to make a further movement by one step, and an interruption routine in FIG. 6 starts at finishing of said time. The program returns to the returning point (1) after the timer T is set. If it is 0, the program returns to the returning point (1) without setting the timer T. In the routine after the returning point (1), it is discriminated whether the timer T is at operation. If it is during operation, the respective processes until the speed control of the machine motor SM is performed without checking the needle phase and the moving phase of the needle. When the setting time of the timer T finishes during this performance, the interruption in FIG. 6 starts. As a result, if the step number necessary to the movement is not 0, the energization time is set as mentioned above, or if said step number is 0, the program returns to a generating point (RET) (FIG. 6) of the interruption without this setting (since this returning point is unstable, it is not described in the main program). The interruption routine is carried out till 0, and the pulse motors PMw, PM$_F$ are rotated by the necessary step number and the stitching coordinate is controlled to form the stitches.

We claim:

1. In an electronic sewing machine having stitch forming and feeding instrumentalities and a pattern panel and employing an electronic memory and an electronic circuit for controlling a needle amplitude and a fabric feed so as to form a plurality of stitching patterns, a combination comprising a pattern selecting controller which selects desired patterns in said plurality of stitching patterns; a memory controller which stores a combination of plural patterns; a function selector which selects a function of the sewing machine in accordance with the formation of selected patterns, including the operation for selecting twin-needle stitching; a function cancelling means operative for removing the selection of the function by said function selector; and a calculation processing device which, when said function cancelling means is operated, controls the respective functions of the sewing machine by way of program control signals stored in said electronic memory, and carries out the control to maintain designation of the patterns selected by said pattern selecting controller or designations of patterns during stitching patterns.

2. The combination as defined in claim 1, wherein the pattern selecting controller is composed of a plurality of pattern-selecting buttons—and includes an indicator of a selected pattern, the machine further including indicating lamps for illuminating said indicator from a rear side of said panel of the sewing machine.

3. The combination as defined in claim 2, including a memorization operator connected to said circuit, said memorization operator being an inverse memorizing button which inverses a pattern asymmetrical with respect to a direction of a needle lateral amplitude, which is to be selected by said pattern selecting buttons at a center of the needle lateral amplitude, and memorizes this pattern.

4. The combination as defined in claim 3, including a memorization operator which is a memorizing button which causes said electronic memory to store a plurality of patterns and stitching sequence thereof in cooperation with said pattern selecting buttons.

5. The combination as defined in claim 4, wherein said function selector is an operating button for dropping a feed dog to be used in stitching when the fabric feed is unstable, and which drops the feed dog under a needle plate of the sewing machine during stitching operation and makes at this time operative the needle lateral amplitude by said pattern selecting buttons.

6. The combination as defined in claim 5, including a twin-needle operator connected to said circuit, said twin-needle operator being a twin-needle operating button operative for reducing the amount of the needle lateral amplitude in the fixed ratio so that the needle of the sewing machine receives the maximum lateral amplitude of the normal single needle.

7. The combination as defined in claim 6, wherein said function cancelling means is a memory cancelling operation button connected to said circuit and said calculation processing device and operative for cancelling an order by operation of said inverse memorizing button and said memorizing button.

8. The combination as defined in claim 7, including a stitching width adjusting dial which is made operative by pushing the same, said dial being adapted to be rotated proportionally enlarging or reducing the width of the needle lateral amplitude, and a stitching length adjusting dial for effecting the amount of the fabric feed.

* * * * *